United States Patent [19]

Holl

[11] 4,000,993
[45] Jan. 4, 1977

[54] PROCESS FOR SCRUBBING GAS STREAMS

[75] Inventor: Richard Adolf Holl, St. Catharines, Canada

[73] Assignee: Micron Engineering Inc., St. Catharines, Canada

[22] Filed: Nov. 10, 1975

[21] Appl. No.: 630,713

[52] U.S. Cl. .................................. 55/94; 55/89
[51] Int. Cl.² ................................... B01D 47/06
[58] Field of Search .................. 55/71, 84–86, 55/89–94

[56] References Cited
UNITED STATES PATENTS

| | | | |
|---|---|---|---|
| 2,127,571 | 8/1938 | Pardee, Jr. | 55/94 X |
| 3,284,992 | 11/1966 | Wikman | 55/71 X |
| 3,690,041 | 9/1972 | Low | 55/71 |
| 3,789,109 | 1/1974 | Lyon et al. | 55/71 X |
| 3,807,139 | 4/1974 | Di Fiore et al. | 55/71 |
| 3,844,879 | 10/1974 | Flais et al. | 55/71 X |
| 3,870,082 | 3/1975 | Holl | 138/40 |

Primary Examiner—Frank W. Lutter
Assistant Examiner—N. Greenblum
Attorney, Agent, or Firm—Hirons & Rogers

[57] ABSTRACT

In a process for scrubbing contaminant gas and/or solids and/or liquids from a gas stream by diffusiophoretic action hydrogen chloride is used as the diffusiophoretic scrubbing component. The hydrogen chloride may be used per se, may be formed in situ, or may be obtained from fuming hydrochloric acid. Certain contaminants may require the use of formaldehyde to combine with them and produce an easily-removable compound. The scrubbing liquid is usually water, although an alkaline solution may be employed to neutralize the acid. The process has high efficiency with very fine particles (less than 1 micron), odours and sub-micron smokes.

38 Claims, 4 Drawing Figures

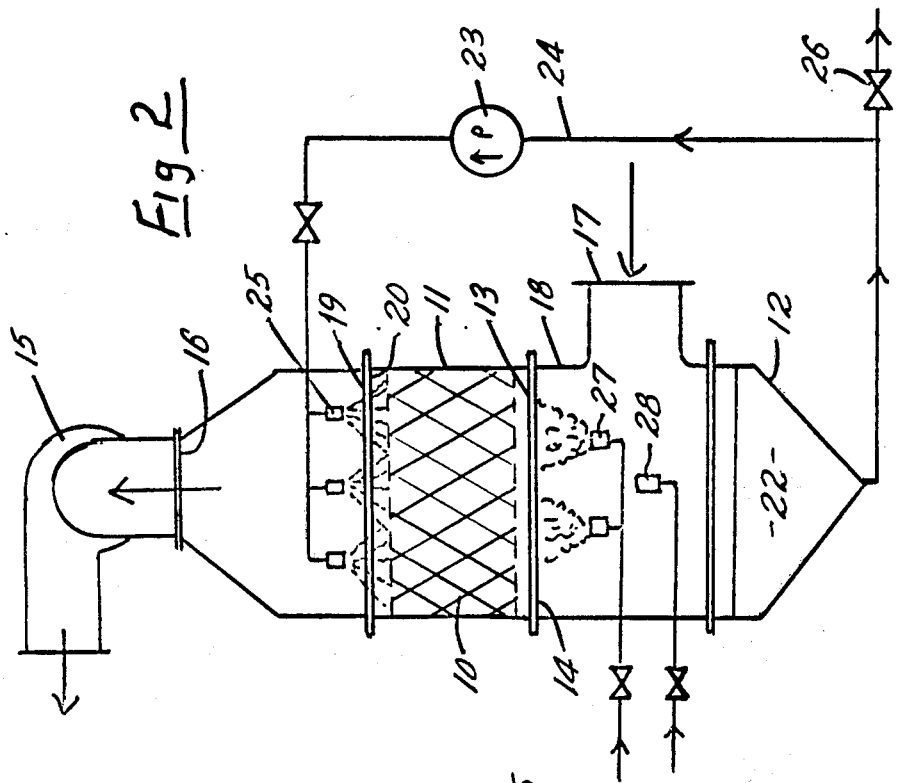
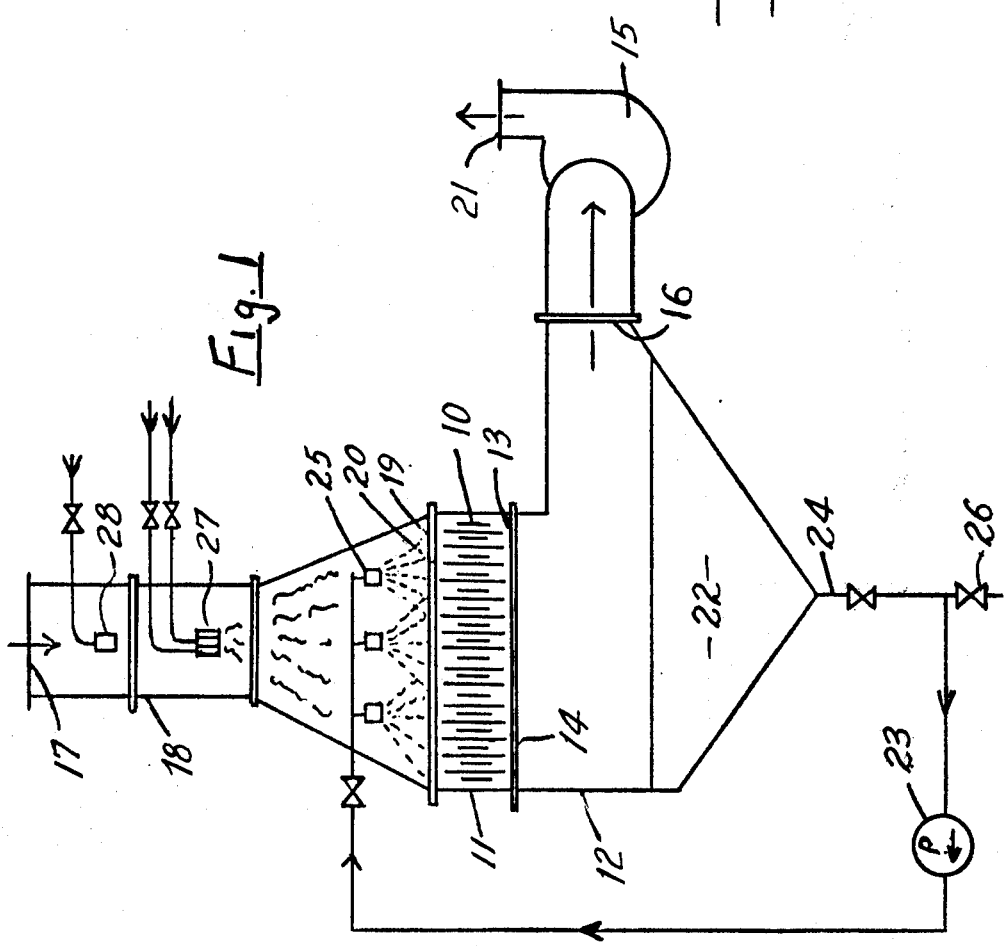

PROCESS FOR SCRUBBING GAS STREAMS

FIELD OF THE INVENTION

This invention is concerned with improvements in or relating to processes and apparatus for scrubbing gas streams, and particularly to such processes and apparatus for the removal of fine particulate material from such streams.

REVIEW OF THE PRIOR ART

The scrubbing of gas streams for the removal from the carrier gas of one or more components entrained therein, such as other gases, vapours, and particulate material, is a well developed art in view of the large number of different applications required in industry. The scrubbing of gas streams to remove particulate material has received increased attention in recent times owing to increasingly stringent environmental regulations. The efficient removal of relatively large particles, that is to say particles having one dimension greater than about 10 microns (0.001 cm), technically is not difficult, but the efficiency of removal of all scrubbers of which I am at present aware falls rapidly with decrease of the particle size below 10 microns; typically the efficiency is as low as 90% by weight with fine particles of about 1 micron (0.0001 cm) dimension or less, and is less than 30% for very fine particles of less than 0.1 micron. There is a need at the present time for efficient processes and apparatus for the removal of such fine and very fine particulate solid materials from gas streams. The difficulty of removal of such particles increases with decrease of their size and the currently used apparatus such as so-called "high energy" venturis are not effective and involve high power consumption in their operation.

Difficulty is experienced at the present time in determining quickly and inexpensively what and how many fine particles are actually present in a particulate gas stream, and correspondingly in determining the efficiency of any scrubber employed to scrub the stream. Owing to their light-scattering effect a gas stream containing fine particles will have a certain degree of opacity to the naked eye when viewed by an observer; the total removal of such opacity is usually an excellent indication that the scrubber is operating at least at 99% efficiency. The high energy scrubbers known to me at this time have great difficulty, or are not able, to remove stack opacity caused by particles below 2 microns, and particularly that caused by particles below 0.5 micron.

There is disclosed in my U.S. Pat. No. 3,870,082, issued Mar. 11, 1975, the disclosure of which is incorporated herein by reference, a new apparatus that can be used, among many other applications, as a wet scrubber for scrubbing gas streams, particularly for the removal of fine particles therefrom, which apparatus employs a large number of parallel closely-spaced plates or wire mesh screens in the flow path.

There is also disclosed in my U.S. application Ser. No. 535,872, filed Dec. 23, 1974, the disclosure of which is also incorporated herein by reference, surface providing apparatus, such as scrubbing apparatus, wherein a large number of wire mesh screens can readily be accurately closely-packed together, for example with spaces between adjacent screens of only 50–100 microns (0.005 to 0.01 cm).

Such apparatus provides highly effective scrubbing of smaller particles, but even this apparatus when using water as the scrubbing medium, and for particles of less than 2 microns, has so far only been able to achieve efficiencies of about 98% with hydrophillic particles, the efficiency dropping to about 50% when the particles are hydrophobic.

It has been known for some time that evaporating liquids and condensing vapours can exert forces on solid particles of sufficiently small size and, for example, a so-called dust free space is found to surround an evaporating water droplet. This effect has been termed diffusiophoresis and may be visualized, for example, by comparison with electrophoresis with the replacement of diffusion forces for the electric forces of the latter.

It has been proposed before to increase the efficiency of wet scrubbers for smaller size particles by what is known as flux force condensation scrubbing, as described for example by Seymour Calvert and Nikhil C. Jhaveri in The Journal of the Air Pollution Control Association; October 1974; Volume 24, No. 10; at pages 946–951. The paper states that flux force and vapour condensation effects have the potential to cause high removal efficiencies for fine particles in low energy scrubbers; these effects can result from the cooling of a hot humid gas by contact with cold liquid, the condensation of injected steam, or other means.

In the flux force system described in this paper particle removal from gas is to be aided by the creation of a temperature gradient, a vapour concentration gradient, vapour condensation, particle growth owing to vapour condensation, or combinations of these four effects. In practice this involves the use of steam injected into the gas stream before it contacts the scrubber sieve plate, heat and filtered steam being added to the gas stream to obtain the desired values of temperature and humidity. The paper reports that diffusiophoresis was the major collection mechanism for a single plate scrubber, but particle growth by condensation was more significant for a multiple plate scrubber.

Such systems and apparatus have inherent problems in that steam is an expensive scrubbing medium to produce, and its condensation produces large quantities of heat that must be eliminated, adding to the costs. Moreover, the efficiency drops rapidly as soon as the gas stream temperature drops below the dew point, because the steam condenses prematurely to mist and thereafter is no longer available for efficient diffusiophoretic scrubbing.

DEFINITION OF THE INVENTION

It is an object of this invention to provide new processes and apparatus for the scrubbing of a gas stream.

It is a more specific object to provide new processes and apparatus for the diffusiophoretic scrubbing of a gas stream employing new scrubbing media.

In accordance with the present invention there is provided a new process for the diffusiophoretic scrubbing of a carrier gas stream to remove contaminant material therefrom including the step of discharging into the gas stream a scrubbing material consisting of hydrogen chloride, with or without the addition of formaldehyde, and thereafter passing the carrier gas stream and entrained scrubbing and contaminant materials through a space containing aqueous scrubbing liquid in which diffusiophoretic absorption of the scrubbing material into the aqueous scrubbing liquid takes place to scrub the contaminant material from the gas stream.

Also in accordance with the invention there is provided a new process for the diffusiophoretic scrubbing of a carrier gas stream containing finely-divided solid contaminant material to be removed therefrom, including the step of discharging into the gas stream a scrubbing component consisting of hydrogen chloride with or without the addition of formaldehyde, and thereafter passing the carrier gas stream and entrained scrubbing and solid contaminant materials through a space containing aqueous scrubbing liquid in which diffusiophoretic absorption of the scrubbing material into the aqueous scrubbing liquid takes place to scrub the finelydivided contaminant material from the gas stream.

The hydrogen chloride may be supplied in the form of fuming hydrochloric acid, the partial pressure of the hydrogen chloride preferably being greater than 10 mm mercury to ensure the production of sufficient hydrogen chloride vapour.

Preferably the amount of hydrogen chloride employed and the temperature of the aqueous scrubbing liquid are such that the partial pressure of the hydrogen chloride absorbed therein is less than 0.1 mm mercury, so that the scrubbing liquid will not emit unacceptable amounts of hydrogen chloride into the atmosphere.

The term "contaminant" as used herein has been adopted for convenience to refer to the material or materials desired to be removed from the gas stream, and is not intended to imply that it has any other property or properties.

DESCRIPTION OF THE DRAWINGS

Processes which are particular preferred embodiments of the invention and apparatus for use in carrying out the invention will now be described, by way of example, with reference to the accompanying diagrammatic drawings, wherein:

FIG. 1 is a plane cross-section through a first apparatus intended for cocurrent operation, FIG. 2 is a similar cross-section of a second apparatus intended for countercurrent operation.

In all of the figures of the drawings the relative thickness of sheets employed in the apparatus, and of the spaces between them are exaggerated for convenience in illustration. Similar parts are given the same reference in all the figures of the drawings.

DESCRIPTION OF THE PREFERRED EMBODIMENTS

Figure 3:
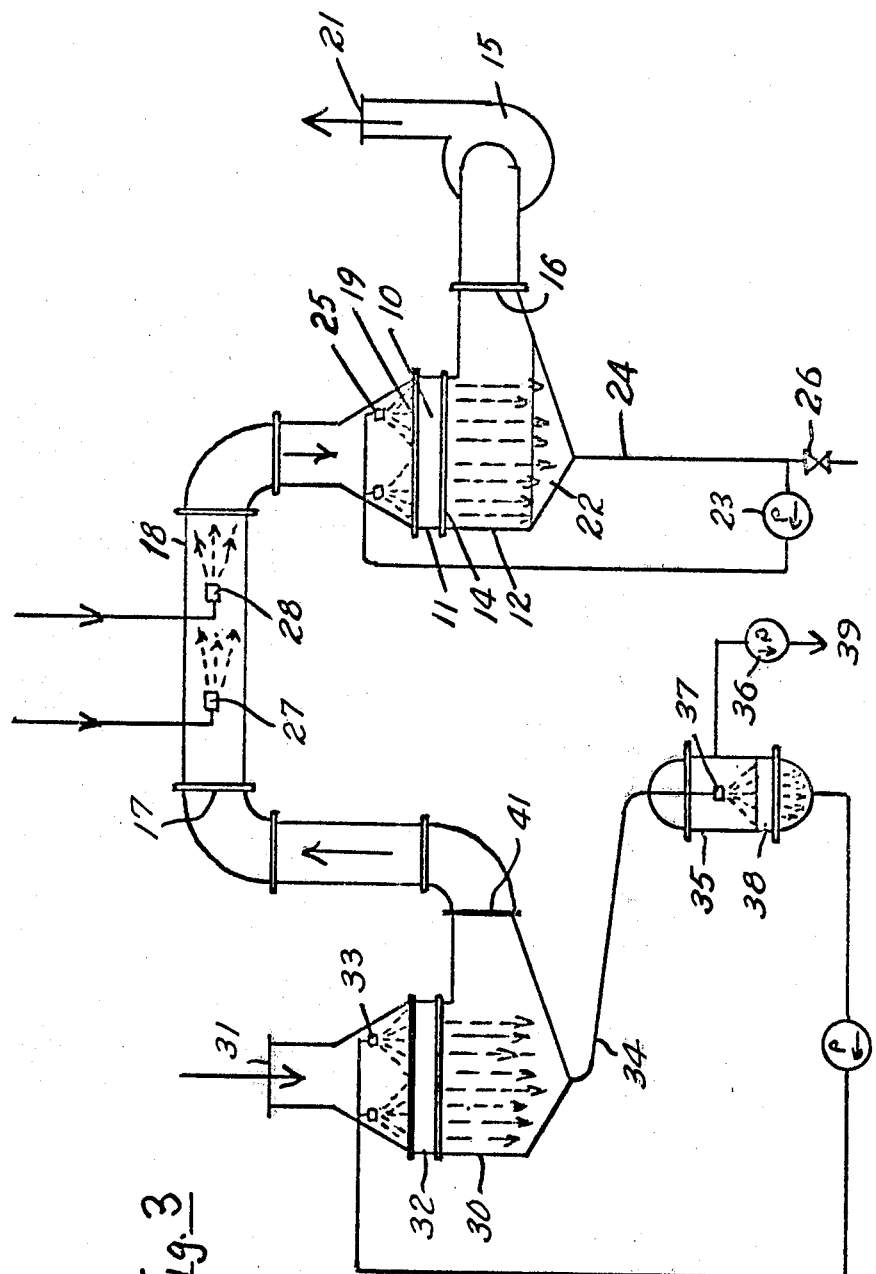
FIG. 3 is a similar view to FIG. 1 of a third apparatus intended specifically for removal of odours and hydrocarbons from air.

FIG. 1 illustrates one specific example of an apparatus intended for cocurrent operation in which the processes of the invention can be performed, consisting of the removal of contaminant material from a gas stream where the gas stream consists of one or any mixture of gases, and the contaminant material entrained therein may be one or any mixture of finely divided liquids, and/or fine and/or very fine particulate material.

In this specific embodiment a scrubbing packing 10 providing what is termed herein a "scrubbing space" is constituted by a square cross-section pipe 11 mounted on a tank 12, the pipe having an outlet 13 discharging to a registering inlet 14 of the tank. An air blower 15 mounted on the tank 12 in registry with tank outlet 16 draws air through inlet 17 of pipe 18, thence through pipe outlet 19 that registers with packing inlet 20, through the packing 10 and the interior of the tank, and discharges it from its outlet 21 back to the ambient atmosphere. The tank contains a body of liquid 22 which is extracted therefrom by a pump 23 via pipe 24 and fed to series of parallel spray nozzles 25 arranged to provide complete uniform delivery of liquid to the scrubbing cell. The contents of the tank 12 can be withdrawn as required through valve 26.

One or both of the specified scrubbing components is entrained in the gas stream passing through the apparatus before it reaches the scrubbing space, and in this embodiment this is done by means of one or both of the nozzles 27 and 28 disposed upstream of the nozzles 25 in the pipe 18. This particular apparatus is intended for operation with the gas stream, scrubbing liquid and scrubbing components all flowing in the same direction (cocurrent). The apparatus of FIG. 2 is intended for operation with the gas stream and scrubbing components flowing in one direction, while the scrubbing liquid flows in the opposite direction.

Preferably the packing 10 providing the scrubbing space is a surface intensive device such as is disclosed in my U.S. Pat. No. 3,870,082 and/or my copending application Ser. No. 535,872.

EXAMPLE 1

The gas stream is air and the material to be removed is fine dust particles in the amount of 20 grains per cubic foot and of the followig particle size distribution:

| | |
|---|---|
| greater than 10 microns | about 50% |
| & 5 – 10 microns | about 15% |
| 1 – 5 microns | about 25% |
| & below 1 micron | about 10% |

The scrubbing component added via the nozzle 27 or 28 is hydrochloric acid mist of 30% concentration, while the scrubbing liquid is water. With a packing 10 of 1000 cfm (1700 m³ per hr) capacity the rate of flow of the scrubbing liquid is from about 100 to 200 gallons (378.5 to 757 liters) per minute, while the amount of hydrochloric acid mist added is about 2 gallons (7.57 liter) per hour. The scrubbing efficiency for particles greater than 1 micron size is effectively 100%, while that for the particles below 1 micron is 99.9%.

The scrubbing component hydrochloric acid mist can with advantage be supplied at a higher temperature than that of the scrubbing liquid, e.g. about 80°–120° C, so that the partial pressure of the hydrogen chloride in the mist phase is very high (e.g. 845 mm of mercury at 100° C and 30% concentration) so that the acid mist is in the fuming state with profuse generation of hydrogen chloride vapour. On the other hand the partial pressure in the scrubbing solution is below 0.1 mm mercury, causing an extremely strong diffusiophoretic flux force many times greater than with steam.

EXAMPLE 2

In this example the scrubbing component is added in the form of hydrogen chloride vapour, the rate of addition 1 to 4 Kg per hour depending upon the requirement for the particular contaminant, so that enough free gas will be available in the packing 10 to perform the required diffusiophoretic scrubbing.

EXAMPLE 3

In this example the scrubbing component is again hydrogen chloride, but the gas is produced in situ in the apparatus by burning chlorine in hydrogen at the nozzle 27, which is provided with separate input pipes for this purpose.

In all the examples described herein an aqueous basic solution may be used as scrubbing liquid in order to neutralise the absorbed acid; no significant increase in the diffusio-phoretic force appears to result and no increase has been noted in the already surprisingly high collection efficiency. Examples of suitable scrubbing liquids are solutions of sodium hydroxide, calcium hydroxide, magnesium hydroxide, and ammonia.

In all of these examples employing hydrogen chloride the scrubbing action toward very fine particles, specifically those of 0.5 microns to less than 0.1 micron, is unexpectedly efficient. It is at present believed that this must be due to some additional function of the hydrogen chloride, or of the hydrochloric acid produced by its association with water. For example, it may be readily absorbed by chemical action on to the small particles, which have a large effective surface, rendering those particles highly hydrophilic and therefore more easily absorbed by diffusiophoretic action from the air stream at the water/gas interface in the scrubber.

EXAMPLE 4

In this example the contaminant materials to be scrubbed from the gas stream are chlorinated hydrocarbon vapours, such as vinyl chloride. Two scrubbing components are employed comprising formaldehyde vapour or a solution in mist form in sufficient concentration, e.g. 1.5 to 2 times the concentration of the vinyl chloride, and hydrogen chloride vapour or a solution in mist form of sufficient concentration, e.g. 1.5 to 4 times the concentration of the vinyl chloride. The temperature at which the formaldehyde mist is supplied is also significant and preferably is from 100° C to 200° C. Preferably the hydrogen chloride is supplied via the nozzle 27, while the formaldehyde is supplied via the nozzle 28. It is believed at the present time that the hydrogen chloride not only provides for diffusiophoretic scrubbing, but also acts as a catalyst for a reaction that takes place between the chlorinated hydrocarbon vapour and the formaldehyde, producing a substance or mixture that is more readily scrubbed by diffusiophoretic action. The scrubbing liquid is preferably an ammonia solution of concentration sufficient to ensure removal of the conditioned chlorinated hydrocarbon to less than 1 p.p.m. and the unreacted formaldehyde to less than about 2 p.p.m. in the exiting gas stream.

EXAMPLE 5

The material to be scrubbed from the air stream consists of the carbon smoke that is produced by incomplete combustion of hydrocarbons. The chief offending material is the carbon black that is produced which is hydrophobic and has an average particle size less than about 0.5 micron. Any one of the combinations of examples 1 to 4 may be used and the removal efficiencies achieved produce an exhaust gas with no visible opacity.

EXAMPLE 6

In this example uncombusted aliphatic hydrocarbons are scrubbed from a gas stream using water as the scrubbing liquid. In the case of propane, for example, removal efficiencies of 92% by weight have been achieved, while efficiencies of 98% can be achieved with solvent vapours of higher molecular weight, for example those in the boiling range 270° C to 300° C.

EXAMPLE 7

A particular problem is encountered in the rapid drying of printing inks in that the inks initially contain aliphatic hydrocarbons which are cracked and/or polymerised at the high temperatures required for rapid drying to give a complex mixture of vapours. These vapours are present for example in the amount of 73 grams per 100 cf (2.8 $M^3$) per minute and require the employment of about 4.4 Kg of 30% hydrochloric acid per hour to scrub to a removal efficiency of 98%.

Referring now to FIG. 3 this illustrates a more comprehensive form of apparatus for the removal of hydrocarbon vapours and odours. The parts corresponding to the apparatus of FIG. 1 have the same reference numbers.

The apparatus comprises a preliminary scrubber device 30 of the type disclosed in my above-mentioned U.S. patent and/or patent application, into the inlet 31 of which the air stream with entrained vapours is drawn by the fan 15. The device 30 has a packing 32 and an absorbing liquid particularly suitable for hydrocarbon vapours is delivered thereto via nozzles 33, for example hexachlorobutadiene. The liquid with hydrocarbon vapour dissolved therein collects in the sump of the apparatus and is fed via pipe 34 to a stripper evaporator device 35 operating under a partial vacuum created by a pump 36. The liquid is sprayed from nozle 37 on to a packing 38 in which, under the effect of the vacuum, the hydrocarbon vapours separate from the absorbing liquid and are passed by the pump 36 to a storage location 39 for concentration and re-use or sale. The separated liquid is returned by pump 40 to the device 30 for re-use therein.

The efficiency of such a condensor unit typically is about 98% by weight and the tail gases exiting from the outlet 41 of the device inevitably have some of the scrubbing liquid entrained therein, together with the unremoved hydrocarbon. This gas stream is now passed to the apparatus of the invention in which, in accordance with the invention, hydrochloric acid and formaldehyde are used together as scrubbing components with a solution of 28% hydrochloric acid as the scrubbing liquid. The gas stream exiting from the far outlet 21 will have both the hydrocarbon vapours and the hexachlorobutadiene scrubbed therefrom to a level of less than 10 p.p.m.

Figure 4:
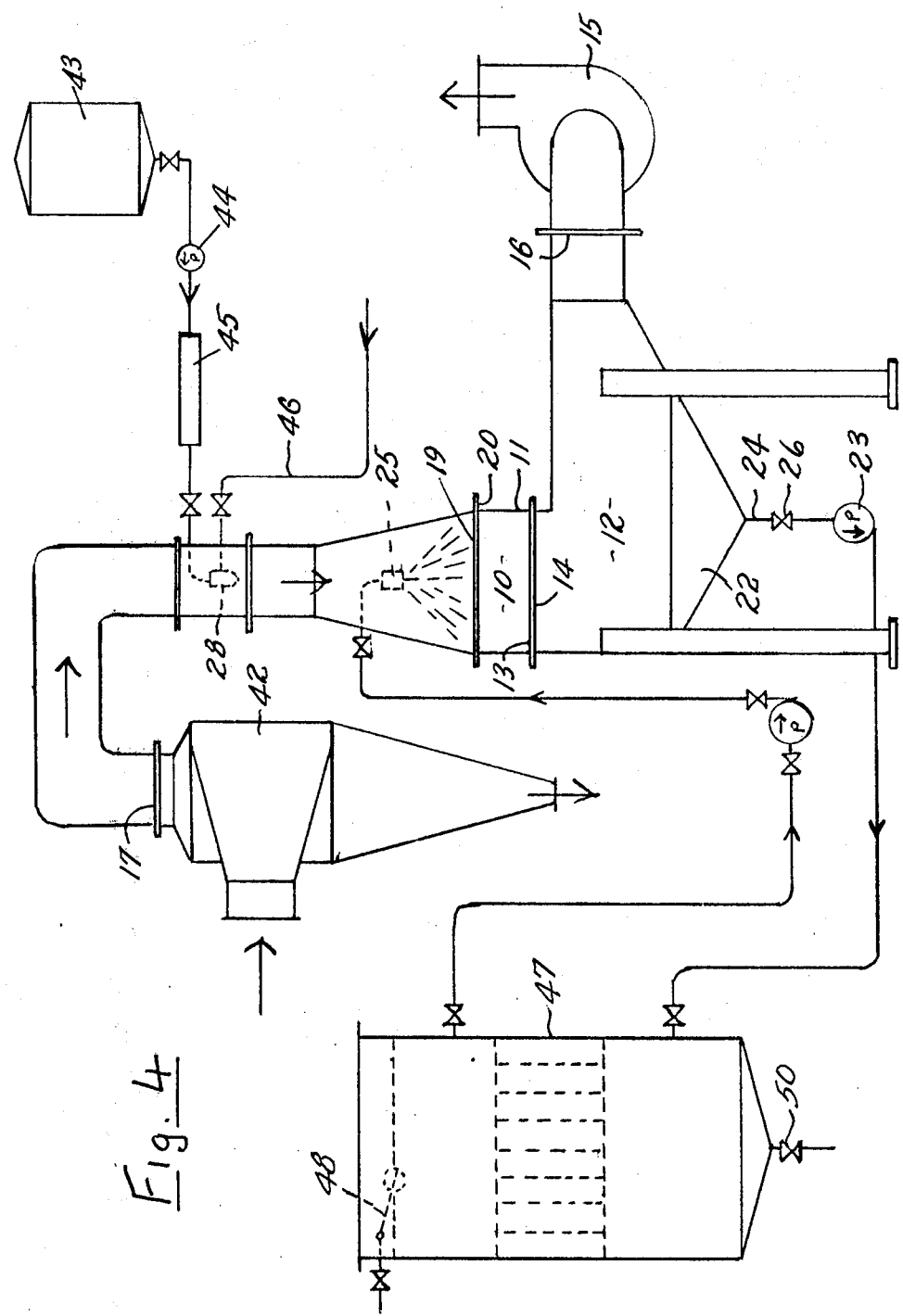
FIG. 4 is a similar view to FIG. 1 of a fourth apparatus intended particularly for the scrubbing of fine particulate material from an air stream.

The apparatus illustrated by FIG. 4 is a development of the apparatus of FIG. 1, and is intended specifically for the scrubbing of fine and very fine solid particulate material from an air stream. The plate spacing in the packing 10 is of the order of only 60–80 microns and accordingly, in order to ensure that larger particles are not delivered to the packing, the scrubber is preceded by a cyclonic precleaner 42 able to remove any particles larger than about 20 microns. The scrubbing component hydrochloric acid is stored in a tank 43 and is fed to the nozzle 28 via a metering pump 44 and a heater 45. Compressed air of for example about 80–100 p.s.i. (5.6–7.0) Kg/sq.cm. is fed to the nozzle 28 via a pipe 46 to ensure adequate atomisation of the liquid acid. The liquid 22 from the separator 12 is fed by the pump 23 to a settling tank 47 in which the water level is controlled, e.g. by a valve 48. Another pump 49 feeds the water from the top of the tank back to the nozzle 25, while the settled solid material is removed via a valve 50.

I claim:

1. A process for the diffusiophoretic scrubbing of a carrier gas stream to remove contaminant material therefrom including the step of discharging into the gas stream a scrubbing material consisting of hydrogen chloride, and thereafter passing the carrier gas stream and entrained scrubbing and contaminant materials through a space in which the gas stream is scrubbed with an aqueous scrubbing liquid such that diffusiophoretic absorption of the scrubbing material into the aqueous scrubbing liquid takes place to scrub the contaminant material from the gas stream.

2. A process as claimed in claim 1, wherein the hydrogen chloride is obtained from hydrochloric acid solution.

3. A process as claimed in claim 2, wherein the partial pressure of the hydrogen chloride in the solution is above 10 mm mercury.

4. A process as claimed in claim 1, wherein the partial pressure of the hydrogen chloride in the scrubbing liquid after scrubbing is less than 0.1 mm mercury.

5. A process as claimed in claim 2, wherein the hydrochloric acid is of concentration from 30% to 32% and is of the temperature from 80° C to 120° C.

6. A process as claimed in claim 1, wherein the hydrogen chloride is obtained by the combustion of hydrogen and chlorine.

7. A process as claimed in claim 1, wherein the available hydrogen chloride is in the amount of from 1.5 to 4 times by weight of the contaminant material.

8. A process as claimed in claim 1, wherein the scrubbing liquid is an alkaline solution for absorption of the hydrogen chloride.

9. A process for the removal of hydrocarbon vapours from a gas stream including the preliminary step of absorbing the bulk of the hydrocarbon vapours from the gas stream with a hydrocarbon solvent, and thereafter scrubbing the gas stream by the process of claim 1 for removal of the hydrocarbon tail gases and the entrained hydrocarbon solvent.

10. A process as claimed in claim 9, and including the step of recovering the hydrocarbon vapour from the hydrocarbon solvent.

11. A process for the diffusiophoretic scrubbing of a carrier gas stream containing finely-divided solid contaminant material to be removed therefrom, including the step of discharging into the gas stream a scrubbing material consisting of hydrogen chloride, and thereafter passing the carrier gas stream and entrained scrubbing and solid contaminant materials through a space in which the gas stream is scrubbed with an aqueous scrubbing liquid such that diffusiophoretic absorption of the scrubbing material into the aqueous scrubbing liquid takes place to scrub the finely-divided contaminant material from the gas stream.

12. A process as claimed in claim 11, wherein the hydrogen chloride is obtained from hydrochloric acid solution.

13. A process as claimed in claim 12, wherein the partial pressure of the hydrogen chloride in the solution is above 10 mm mercury.

14. A process as claimed in claim 12, wherein the hydrochloric acid is of concentration from 30% to 32% and is of the temperature from 80° C to 120° C.

15. A process as claimed in claim 11, wherein the partial pressure of the hydrogen chloride in the scrubbing liquid after scrubbing is less than 0.1 mm mercury.

16. A process as claimed in claim 11, wherein the hydrogen chloride is obtained by the combustion of hydrogen and chlorine.

17. A process as claimed in claim 11, wherein the available hydrogen chloride is in the amount of from 1.5 to 4 times by weight of the contaminant material.

18. A process as claimed in claim 11, wherein the scrubbing liquid is an alkaline solution for absorption of the hydrogen chloride.

19. A process for the diffusiophoretic scrubbing of a carrier gas stream to remove contaminant material therefrom including the step of discharging into the gas stream a scrubbing material consisting of hydrogen chloride and formaldehyde, and thereafter passing the carrier gas stream and entrained scrubbing and contaminant materials through a space in which the gas stream is scrubbed with an aqueous scrubbing liquid such that diffusiophoretic absorption of the scrubbing material into the aqueous scrubbing liquid takes place to scrub the contaminant material from the gas stream.

20. A process as claimed in claim 19, wherein the available hydrogen chloride is in the amount of from 1.5 to 4 times, and the formaldehyde is in the amount of 1.5 to 2 times, both by weight of the contaminant material.

21. A process as claimed in claim 19, wherein the hydrogen chloride is obtained from hydrochloric acid solution.

22. A process as claimed in claim 21, wherein the partial pressure of the hydrogen chloride in the solution is above 10 mm mercury.

23. A process as claimed in claim 21, wherein the hydrochloric acid is of concentration from 30% to 32% and is of the temperature from 80° C to 120° C.

24. A process as claimed in claim 19, wherein the partial pressure of the hydrogen chloride in the scrubbing liquid after scrubbing is less than 0.1 mm mercury.

25. A process as claimed in claim 19, wherein the hydrogen chloride is obtained by the combustion of hydrogen and chlorine.

26. A process as claimed in claim 19, wherein the available hydrogen chloride is in the amount of from 1.5 to 4 times by weight of the contaminant material.

27. A process as claimed in claim 19, wherein the scrubbing liquid is an alkaline solution for absorption of the hydrogen chloride.

28. A process for the removal of hydrocarbon vapours from a gas stream including the preliminary step of absorbing the bulk of the hydrocarbon vapours from the gas stream with a hydrocarbon solvent, and thereafter scrubbing the gas stream by the process of claim 21 for removal of the hydrocarbon tail gases and the entrained hydrocarbon solvent.

29. A process as claimed in claim 28, and including the step of recovering the hydrocarbon vapour from the hydrocarbon solvent.

30. A process for the diffusiophoretic scrubbing of a carrier gas stream containing finely-divided solid contaminant material to be removed therefrom, including the step of discharging into the gas stream a scrubbing material consisting of hydrogen chloride and formaldehyde, and thereafter passing the carrier gas stream and entrained scrubbing and solid contaminant materials through a space in which the gas stream is scrubbed with an aqueous scrubbing liquid such that diffusiophoretic absorption of the scrubbing material into the aqueous scrubbing liquid takes place to scrub the finely-divided contaminant material from the gas stream.

31. A process as claimed in claim 30, wherein the available hydrogen chloride is in the amount of from 1.5 to 4 times, and the formaldehyde is in the amount of 1.5 to 2 times, both by weight of the contaminant material.

32. A process as claimed in claim 30, wherein the hydrogen chloride is obtained from hydrochloric acid solution.

33. A process as claimed in claim 32, wherein the partial pressure of the hydrogen chloride in the solution is above 10 mm mercury.

34. A process as claimed in claim 32, wherein the hydrochloric acid is of concentration from 30% to 32% and is of the temperature from 80° C to 120° C.

35. A process as claimed in claim 30, wherein the partial pressure of the hydrogen chloride in the scrubbing liquid after scrubbing is less than 0.1 mm mercury.

36. A process as claimed in claim 30, wherein the hydrogen chloride is obtained by the combustion of hydrogen and chlorine.

37. A process as claimed in claim 30, wherein the available hydrogen chloride is in the amount of from 1.5 to 4 times by weight of the contaminant material.

38. A process as claimed in claim 30, wherein the scrubbing liquid is an alkaline solution for absorption of the hydrogen chloride.

* * * * *